Dec. 31, 1940.  J. M. HILDABOLT  2,227,308
METHOD OF MOLDING METAL POWDERS
Filed March 15, 1939

HEAT DESTRUCTIBLE MATERIAL

INVENTOR
John M. Hildabolt
BY
Spencer Hardman & Fehr
his ATTORNEYS

Patented Dec. 31, 1940

2,227,308

UNITED STATES PATENT OFFICE 2,227,308

METHOD OF MOLDING METAL POWDERS

John M. Hildabolt, Dayton, Ohio, assignor to General Motors Corporation, Detroit, Mich., a corporation of Delaware Application March 15, 1939, Serial No. 261,925

7 Claims. (Cl. 75—22)

This invention relates to molded objects and more particularly to a method of molding metal powders into objects having cored portions therein.

It is an object of this invention to provide a method of making highly porous cored metal objects wherein a destructible core is used and is surrounded within the mold by loose non-compacted metal powder. Upon subjecting the assembly to a sintering heat for a sufficient time, the metal powder sinters together to form a strong highly porous object while the core is at least partially destroyed.

In carrying out the above object it is a further object in some cases to support the core within the mold by means of the metal powder.

Another object of the invention is to provide a mold of destructible material which confines the metal powder therein for a sufficient time to permit the powder to sinter together, the mold then disintegrating due to the heat.

A further object in carrying out the above object is to provide cores of sand with a binder, asbestos with a binder, asbestos paper, etc., graphite with a binder, etc., which cores upon heating are destroyed due to disintegration thereof as the binder is decomposed.

Further objects and advantages of the present invention will be apparent from the following description, reference being had to the accompanying drawing wherein a preferred embodiment of the present invention is clearly shown.

In the manufacture of porous metal objects it has heretofore been impossible to fabricate such objects having cored portions therein, which included re-entrant angles. The conventional procedure of briquetting metal powder into a self sustaining mass precluded the possibility of re-entrant angles within the cored portion of the briquette, since re-entrant angles prevent the removal of the die plunger, thus all briquetted articles which include cored portions are necessarily designed so that the die plunger is easily removed therefrom after the compacting of the metal powders. A more recent development in the art of powder metallurgy proposes the use of loose metal powders in non-compacted condition in molds, wherein the powdered metal upon heating in the mold sinters together to form a self-sustaining highly porous mass. The porosity of articles made by the loose powder method is considerably higher than the porosity of articles made by briquetting methods. In a number of applications, this increased porosity is advantageous. Furthermore, the loose powder method is considerably cheaper, since it obviates the necessity of the expensive die equipment used in the briquetting of powdered metal. The porosity of articles made by the loose powder method can be controlled to some extent by the use of various sized metal powders, thus when using a fine mesh powder, say 300 mesh, the powder packs more closely in the mold and the porosity of the final article is less than an article made in the same mold of 150 mesh powder.

The present invention is particularly directed to a method of making cored articles by the loose powder method, wherein the cored portion may include re-entrant angles. To accomplish this, I utilize a core of a destructible material, such as an asbestos paper core or a baked sand core. This core is placed in a mold and the loose powder is poured there-around. Upon sintering, the powder agglomerates and sinters together prior to the destruction of the core by the heat, and when the article has cooled and is removed from the mold, the disintegrated core may easily be removed from the cored portion of the article. In each instance, the core is placed within the mold and the metal powders are poured therein so as to surround the core, and in many cases support the same.

It is also within the scope of my invention to utilize molds made of destructible material such as asbestos paper molds, thus obviating the necessity of the more expensive graphite mold.

Figure 1:
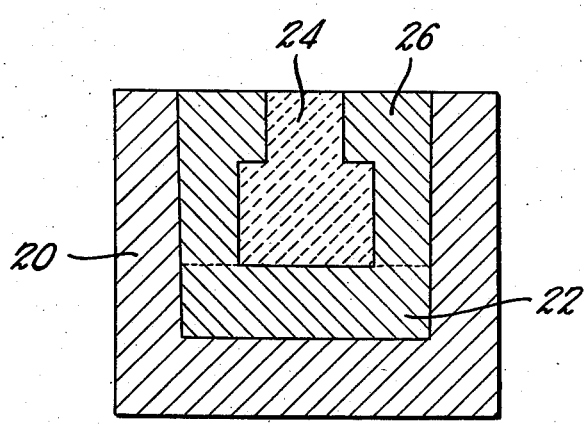
Fig. 1 shows a mold with a core supported therein by the metal powders.

Referring to Fig. 1, one application of the invention is shown wherein 20 indicates a graphite mold, which may be in multiple, in which a layer of powder 22 is initially placed to a desired depth. A destructible core 24 is then placed on top of the layer 22, and the remainder of the mold is filled with metal powder 26. The entire assembly is then placed in a sintering furnace and heated under non-oxidizing conditions to a temperature and for a time sufficient to cause the metal powders to sinter together and form a strong porous structure having a cored portion therein. Simultaneously with the sintering, the binder in the core material is burned out and the core disintegrates. After cooling the porous article shrinks slightly from the walls of the mold and is easily removed therefrom, and the disintegrated core material is likewise easily removed from the cored portion of the article.

Figure 2:
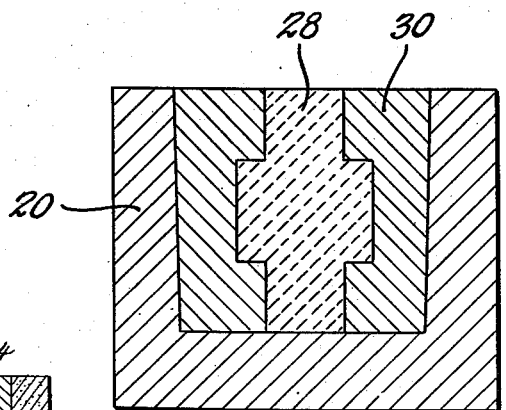
Fig. 2 shows another means of supporting the core.

Fig. 2 shows another application of the invention wherein the mold 20 includes a destructible core 28 therein, and powdered metal 30 is poured therearound to suport the core in position. After sintering the disintegrated core 28 may be removed.

Sintering times and temperatures and particular types of metal powders used are all well known in the art. For example, mixtures of copper and tin powders are often used which upon sintering form a bronze, likewise copper and nickel may be used, pure copper powder, iron powder, bronze powder, iron and copper powder, aluminum powder and any of the other metal powders which are desired may be used either in the pure state or mixed to form alloys. Likewise, small quantities of non-metallic ingredients, such as abrasives may be added, or small quantities of graphite may also be included according to the specific application of the article. Similarly the molds may be made from materials other than graphite, if a permanent type mold is desired. For example, stainless steel molds, chromium plated molds, or high nickel steel molds may all be utilized, providing the internal surface thereof is dusted with graphite, alundum or some like material which prevents the metal powder from sticking to the mold during sintering operation. As previously noted, the destructible cores may be fabricated from asbestos paper, asbestos fiber mixed with a binder which is deteriorated with heat, sand, graphite, plaster of Paris etc. formed to the desired shape by use of the binder which is destroyed by heat, or any other well known refractory material which is held together by the use of a binder which is destroyed by heat, such binders falling in the class of organic compounds such as molasses, organic gums, glue or resins, all of which are well known in the art.

Figure 3:
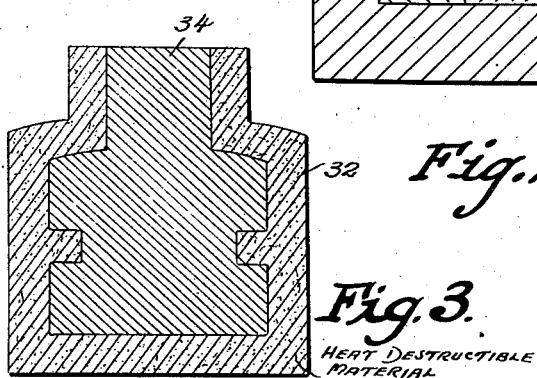
Fig. 3 shows a mold of destructible material for use in the molding of objects having re-entrant angles on the surfaces thereof.

The invention is not limited to cored articles, for as heretofore stated in instances where permanent mold equipment is not desired, molds may be fabricated from destructible materials such as, asbestos paper or any other desired material, which mold is disintegrated by heat. In Fig. 3, 32 illustrates a heat destructible mold which is filled with metal powder 34. The assembly is then placed in a sintering furnace whereupon after the powder 34 sinters together, the mold 32 disintegrates thereby permitting removal of the sintered objects from the remains of the mold. This object has re-entrant angles on the exterior thereof. A core may also be used if required.

It is therefore in the scope of this invention to include molding equipment wherein the mold or the core therefor, or both, are formed from a heat destructible material, which disintegrates upon sintering and is easily removed from the article after cooling.

While the embodiment of the present invention as herein disclosed, constitutes a preferred form, it is to be understood that other forms might be adopted, all coming within the scope of the claims which follow.

What is claimed is as follows:

1. A method of making highly porous cored metal objects having re-entrant angles in the cored portions thereof, comprising the steps of; providing a mold and a destructible core of the desired configurations; supporting the core in the mold in spaced relation therewith by filling the mold with non-compacted metal powder; heating the assembly to a sintering heat for causing the metal powder to form a rigid highly porous object and simultaneously causing the core to be destroyed, and then removing the object from the mold.

2. A method of making highly porous cored objects having re-entrant angles in the cored portions thereof from non-compacted metal powder, comprising; partially filling a mold cavity with loose metal powder; supporting a destructible core on said powder; pouring additional powder loosely into the mold to completely fill the mold; heating the mold, core and powder under suitable conditions for a time and at a temperature sufficient to cause the powder to form a rigid highly porous metal object and simultaneously at least partially destroy the core.

3. A method of making highly porous cored objects having re-entrant angles in the cored portions thereof from non-compacted metal powder, comprising; supporting a destructible core in a mold cavity by metal powder loosely filled therein; heating the mold, core and powder at a sintering temperature and under suitable conditions, for a time sufficient to cause the metal powder to form a rigid highly porous metal object and simultaneously at least partially destroy the core.

4. A method of making highly porous cored objects having re-entrant angles in the cored portions thereof from non-compacted metal powder, comprising; placing a core of a heat destructible material in the mold; filling the mold with loose metal powder; heating the assembly of the mold, core and powder under suitable conditions at a temperature and for a time sufficient to cause the powder to sinter together and form a strong highly porous metal object and to concomitantly cause the core to be at least partially destroyed.

5. A method of making molded objects having re-entrant angles thereon from non-compacted metal powder, comprising; providing mold portions, at least one of which is fabricated from destructible material; assembling said portions; pouring metal powder in the mold assembly; heating the assembly with the metal powder therein at a sintering heat for causing the metal powders to sinter together and form a strong highly porous object and concomitantly causing said destructible mold portion to be at least partially destroyed.

6. A method of making molded objects having re-entrant angles thereon from non-compacted metal powder comprising; providing a mold of heat destructible material of the desired configuration, pouring metal powder into said mold, heating the mold with the metal powder therein to cause the metal powder to sinter together and form a highly porous object and concomitantly cause the mold to be at least partially destroyed.

7. The method of making cored molded objects in which the core is not readily removable due to the configuration thereof comprising, providing a mold and a destructible core of the desired configuration, placing the core in the mold and pouring loose, non-compacted metal powder therearound, heating the assembly to a sintering temperature under suitable conditions and for a time sufficient to cause the powder to form a rigid highly porous metal object and simultaneously to cause the core at least to be partially destroyed and then removing the object from the mold and the remainder of the core from the object.

JOHN M. HILDABOLT.